United States Patent [19]

Lini

[11] Patent Number: 5,310,568

[45] Date of Patent: May 10, 1994

[54] ACTIVE CHARCOAL PACKETS FOR PURIFICATION OF IMPURE AQUEOUS MEDIA

[75] Inventor: Hedi Lini, Saint Brice, France

[73] Assignee: Ceca S.A., Puteaux, France

[21] Appl. No.: 970,022

[22] Filed: Nov. 2, 1992

[30] Foreign Application Priority Data

Oct. 31, 1991 [FR] France ................................ 91 13441

[51] Int. Cl.$^5$ .............................................. C12H 1/00
[52] U.S. Cl. ........................................ 426/422; 134/6;
134/10; 206/524.7; 210/679; 210/694; 426/112;
426/394; 426/442
[58] Field of Search ............... 426/422, 442, 592, 659,
426/106, 112, 268, 269, 330, 330.4, 590, 394,
392; 206/524.7; 134/6, 10; 210/679, 694;
252/184, 62.54

[56] References Cited

U.S. PATENT DOCUMENTS 1,694,040 12/1928 Ray et al. .
4,544,693 10/1985 Surgant ................................ 524/375

FOREIGN PATENT DOCUMENTS 0148170 7/1985 European Pat. Off. .
0366231 5/1990 European Pat. Off. .
53-116289 10/1978 Japan .
56-144742 11/1981 Japan .................................. 426/422
62-004800 1/1987 Japan .
63-88036 4/1988 Japan .................................. 426/422

*Primary Examiner*—Donald E. Czaja
*Assistant Examiner*—Anthony Weier
*Attorney, Agent, or Firm*—Burns, Doane, Swecker & Mathis

[57] ABSTRACT

Impure aqueous media, e.g., contaminated white wines or sugar-containing liquors, are purified by (i) immersing therein a package which comprises a unit purifying amount of a characteristically chemical active charcoal powder enveloped within a film of a water-soluble, notably PVA polymer, (ii) permitting such package to dissolve and intimately contacting the active charcoal powder with the impure aqueous medium for such period of time as to sorb the impurities therein onto the active charcoal powder, and (iii) thence recovering and optionally filtering the aqueous medium thus purified, and whereby essentially none of the water-soluble polymer is present therein.

7 Claims, No Drawings

ACTIVE CHARCOAL PACKETS FOR PURIFICATION OF IMPURE AQUEOUS MEDIA

BACKGROUND OF THE INVENTION

1. Field of the Invention

The present invention relates to the purification/treatment of impure liquid media by adsorbing objectionable contaminants therein onto an activated charcoal; such active charcoal is introduced into such media in the form of a unit dosage purifying amount thereof sealedly packaged within a film of a water dispersible/soluble polymer, notably polyvinyl alcohol.

2. Description of the Prior Art

It is known to this art that active charcoals are materials produced by carbonization of various carbonaceous substrates, e.g., wood, coal or polymers, and which have been subjected to an activation treatment which confers upon such substrates a high porosity and a high adsorbing power or capacity. Such properties have long been exploited for the separation or purification of gases and for the decoloration, purification or deodorization of liquids.

Industrial applications; of active charcoals for the treatment of liquids are very numerous and also well known to this art, both in the food sector (refining of sugarbeet sugar or cane sugar, production of glucose or lactose, treatment of white wines, ciders or fruit juices, production of glutamic acid or of pectin, and the like), and in the chemical sector (production of tartaric acid, glycerol, and the like) or in various industrial treatments (recovery of solvents, spent plating baths, degassing of drilling muds, and the like).

For all of the above applications, a problem is presented regarding the handling and use of such charcoals. When the treatment can be carried out by percolation, charcoals are used that have been obtained directly in the form of rods or granules obtained from powder. But it is the powder, because it permits intimate contact between the charcoal and the liquid to be purified, which constitutes both the simplest and the most efficient form thereof.

The amounts of charcoal employed, on the order of one kilogram per cubic meter, do not substantially alter the rheology of the liquids treated, the contact time can be as prolonged as desired, and the separation of the charcoal from the purified liquid is easily carried out by settling or by filtration. All of the sequences where the charcoal is introduced wet, or dispersed in the liquid, are conducted with the greatest of ease; on the other hand, the preliminary operations suffer from the difficulties inherent in the handling of any dry powder, in particular those which relate to the low apparent density of the uncompacted charcoal, and also to a certain heterogeneity when wetted. These disadvantages have been partially remedied by using charcoals packaged in the form of fragmentable granules which disintegrate when immersed in a liquid. This, however, is but a partially satisfactory solution in the sense that a perfectly fragmentable granule is an impossible compromise between a rapid spontaneous dispersion of the charcoal in the liquid and the absence of dusting on storing and handling.

SUMMARY OF THE INVENTION

Accordingly, a major object of the present invention is the provision of special packages of unit purifying amounts of active charcoal powder sealedly confined within an enveloping film of a water-dispersible polymer, and which special packages conspicuously avoid the above disadvantages and drawbacks to date characterizing the state of this art.

DETAILED DESCRIPTION OF THE PREPERRED EMBODIMENTS OF THE INVENTION

More particularly according to the present invention, water-soluble bags have heretofore been employed in the packaging art. Polyvinyl alcohol ("PVA") bags have thus been used to collect soiled linen in hospitals for transport to washing machines without other contact with personnel; more recently, films of the same polyvinyl alcohol have been used to form small unit charges of detergent powders for washing underwear or dishes (see, for example, the published Japanese patent applications JP-62/004,800 or JP-01/0,234,900). These '800 and '900 applications describe that the packaging dissolves on contact with the detergent solutions and is discarded to waste, the last traces thereof on the treated article, in this case linen, being removed therefrom during the successive rinsing cycles. Soluble packaging has also been recommended for the packaging of chemicals for agriculture (see EP-148,170), in which case the PVA of the packaging is diluted in nature and probably is subjected to a biological degradation. The problem is entirely different if such a material is included in the treatment of a liquid which is to be purified and in which there is no question of removing impurities by replacing them with others, in this case those which emanate from the dissolution of a packaging material.

It has now been determined that active charcoal can be sealed within water-soluble packagings of polyvinyl alcohol and which can be used as such for the purification of aqueous liquids without any trace of the packaging material, namely, the PVA, being present in the treated liquid, given a judicious selection of the particular active charcoal. It is very surprising that such a combination would be effective, for, on the one hand, not all charcoals achieve the complete adsorption of the PVA from solutions thereof, and, on the other, under actual operating conditions, there is every risk of the PVA thus introduced entering into competition with the species targeted for extraction.

This invention thus also features a process for the purification of impure aqueous liquids utilizing active charcoal, comprising introducing the purifying agent and dispersing it in the liquid to be purified, maintaining the liquid to be purified in contact with the purifying agent, and then drawing off and optionally filtering the purified liquid, the purifying agent being a chemical-origin active charcoal powder confined within a wrapping which characteristically is a water-soluble polyvinyl alcohol film. The present invention also features such purifying agent, per se.

Many types and qualities of active charcoals exist in this art, including the charcoals which are designated "physical" because they are produced by thermal activation of the initial charcoal (wood, coconut shell, carbonized coal) in the gas phase, in this case from a partial gasification in an oxidizing atmosphere ($H_2O$, $CO_2$, and the like) at a temperature on the order of 900° C., and the charcoals designated "chemical" which differ in that the starting material (wood, coconut shell, coal) is heated in the presence of a dehydrating or oxidizing agent, or else both at the same time (zinc chloride, phosphoric acid), this process generally being carried out without prior carbonization at a relatively low temperature (less than 800° C.), the chemical substance then being removed from the activated charcoal upon successive washings.

In consequence of the particular operating conditions, many qualities of active charcoals are produced industrially. The porous textures obtained are very different and each of them is suited to a particular type of use. These qualities are distinguished by various characteristics well known to this art, of which the most significant are:

(a) The pore volume;
(b) The BET specific surface;
(c) The iodine index;
(d) The blue index.

It will of course be appreciated that:

(a) The pore volume is the total volume of nitrogen adsorbed at saturation at a temperature of 77° K. ($-196°$ C., the temperature of liquid nitrogen at atmospheric pressure), measured according to the French standard NF X 11-621 and expressed as $cm^3$ per gram of charcoal;

(b) The BET specific surface is the total surface area accessible to nitrogen at 77° K. in $m^2$ per gram of charcoal; it is measured, as is the above property, by volumetric adsorption of nitrogen at low temperature (French standard NF X 11-621);

(c) The iodine index is the quantity in grams adsorbed per 100 grams of charcoal; it is measured according to that technique entailing adding 20 ml of a N/5 iodine solution to 0.2 gram of dry charcoal, stirring for 4 minutes, filtering and determining the iodine remaining in the filtrate using an N/10 sodium thiosulfate solution;

(d) The blue index is measured by the number of milliliters of standard solution of methylene blue decolorized by 0.1 g of active charcoal (measured dry), according to the CEFIC (Conseil Européen des Fédérations de l'Industrie Chimique) technique as described in *Deutsches Arzneibuch*, 6th edition).

These characteristics are tabulated below for three chemical charcoals and four physical charcoals, respectively designated $C_1$, $C_2$, $C_3$, and $P_1$, $P_2$, $P_3$, $P_4$.

cations and anions, the remainder (824) being polyvinyl alcohol.

PVA has been recommended as an agent for treating wines, especially for improving the wines from Soviet Armenia which contain too much tannin (see N. B. Kazumov et al, *Prom-st., Arm.*, 6, 503 (1976)); it is reputed to develop no toxicity such as would prohibit its use in the food or pharmaceutical industry. The acute oral toxicity of PVA in female rats is zero ($LD_{50} > 5,000$ milligrams per kg); its acute toxicity with respect to goldfish is likewise negligible ($LD_{50}$ after 48 and 96 hours $> 500$ milligrams per liter). This product as a 25% aqueous solution if not irritating to the skin and mucous membranes of rabbits according to the procedure advocated by the U. S. Food and Drug Administration. However, since it is not included in the FDA rules and regulations as an approved food additive, it cannot be present in a food product; as it is not included in the Code du Vin (wine code), in the Community winegrowing regulations and in the Codex oenologique (oenological standards), it also must not be present in wines. In any event, it is preferable not to include PVA in products which are destined to be purified by treatment with an active charcoal.

The purifying agents according to this invention are typically packaged in units of approximately 10 grams to approximately 5 kilograms, comprising active charcoal powder, notably of chemical origin, contained within heat-sealed bags fabricated from PVA film. The weight ratio between the polyvinyl alcohol and the chemical-origin active charcoal obviously varies according to the size of the units of purifying agent and the conditions to which they will be subjected; it ranges from approximately 0.1% for relatively bulky units of 5 to 10 kg to approximately 5% for small charges of approximately 10 grams.

In order to further illustrate the present invention and the advantages thereof, the following specific examples are given, it being understood that same are intended only as illustrative and in nowise limitative.

EXAMPLE 1

Dispersion in water of various active charcoals packaged within a PVA film

| Indices and characteristics | Chemical charcoals | | | Physical charcoals | | | |
|---|---|---|---|---|---|---|---|
| | $C_1$ | $C_2$ | $C_3$ | $P_1$ | $P_2$ | $P_3$ | $P_4$ |
| Pore volume | 0.97 | 1.5 | 1.7 | 0.3 | 0.5 | 0.77 | 0.97 |
| $S_{BET}$ ($m^2$/g) | 1200 | 1700 | 1900 | 750 | 900 | 1150 | 1310 |
| Iodine | 120 | 145 | 152 | 84 | 100 | 120 | 143 |
| Blue | 13 | 18.5 | 20 | 5 | 9 | 12 | 19 |

The chemical charcoals such as $C_3$ characterize the present invention, these having a pore volume greater than 1.5 $cm^3$/g, preferably equal to or greater than 1.7, having a BET specific surface greater than 1,700 $m^2$/g, preferably equal to or greater than 1,900, having an iodine index greater than 145, preferably equal to or greater than 150 and having a blue index greater than 19, preferably equal to or greater than 20.

The polyvinyl alcohol suitable for providing the packages of the invention is advantageously in the form of a film having a thickness of 25 to 200 microns, which contains approximately 8% glycerol (pharmacopoeia glycerol), 9.8% starch and talc, and 0.2% of various To test the dispersion of the charcoal, the dissolution of the PVA and the development of its concentration as a function of the type of active charcoal employed, a small packet of 10 grams of active charcoal sealedly wrapped within a PVA film having a weight of 100 milligrams was introduced into 10 liters of water. The dissolution of the film and the dispersion of the charcoal in the water were aided by gentle stirring for 4 hours, after which the mixture was filtered on sintered glass having a porosity of 15 to 40 μm. Then the colorimetric determination of the PVA in the filtrate was carried out according to the technique described by Charles E. Baumgartner in *Analytic Chemistry*, 56, 27169–27180

(1987). The threshold of detection of the PVA according to this technique was 0.6 milligrams per liter.

The results obtained are reported in the following Table I:

TABLE I

| Charcoal | PVA (mg/l) | % Adsorption |
|---|---|---|
| $C_2$ | not measurable | ≈100% |
| $C_3$ | not measurable | ≈100% |
| $P_1$ | 3.6 | 64% |
| $P_3$ | 2.5 | 75% |

These results evidence that by using chemical-origin charcoals such as $C_2$ or $C_3$ packaged within PVA, detectable PVA was not determined in the treated liquids.

EXAMPLE 2

Decoloration of a sugar syrup

The decoloration was carried out of a sugar syrup whose density was 1.268 and whose Brix degree (grams of dry sugar in 100 grams of solution) was 59.2, using active charcoal at a concentration of 10 grams of charcoal per liter of syrup.

The charcoals were selected from among the chemical-origin charcoals and had the quality ordinarily used for decoloration, here designated $C_2$ and $C_3$; both were used either as such or sealedly packaged in PVA bags (1% PVA with respect to the charcoal).

The results obtained are reported in Table II, in the "decoloration" column of which are indicated the percentages of decoloration after treatment and in the "PVA" column the percentages of residual PVA expressed as a percentage of introduced PVA.

TABLE II

| Charcoal | Decoloration (%) | PVA (%) |
|---|---|---|
| $C_2$ | 84 + 1 | — |
| $C_2$/PVA | 83 + 1 | 12 |
| $C_3$ | 98 + 1 | — |
| $C_3$/PVA | 98 + 1 | not measurable |

These results evidence that, under the conditions of the test, no detectable adverse effect was elicited by the PVA on the decolorizing power of the chemical-origin charcoals.

It was observed that the presence of PVA and its coadsorption had no perceptible influence on the decolorizing abilities of the charcoals under test. The charcoal system "$C_3$"/PVA was very particularly advantageous as a decolorant since no PVA persisted in the treated liquids.

EXAMPLE 3

Decoloration of white wine

The decoloration of a stained Val de Loire white wine was carried out using various active charcoals, each being employed at a charge of 1 gram per liter. Under the conditions of the test, the decoloration was satisfactory with all of the charcoals used, whether the charcoal was used as such or packaged in a PVA film.

The results obtained are reported in Table III, indicating analysis of the residual PVA according to the type of charcoal used and the weight ratios of the packaging PVA to the charcoal, respectively 1% and 2.5%, which corresponds to a PVA introduction into the wine of 10 or 25 milligrains per liter.

TABLE III

| Charcoal | Introduced PVA (mg/l) | Remaining PVA (mg/l) |
|---|---|---|
| $C_2$ | 10 | 1.6 |
| $C_3$ | 10 | not measurable |
|  | 25 | not measurable |
| $P_1$ | 10 | 6.0 |
| $P_2$ | 10 | 4.7 |
|  | 25 | 6.5 |
| $P_3$ | 10 | 3.4 |
| $P_4$ | 10 | 1.7 |
|  | 25 | 1.5 |

It was observed that the active charcoal/PVA system had a substantially different behavior in white wine and in water; very probably competition existed for adsorption onto the charcoal between the PVA and various molecules present in the wine.

The overall result was that industrial active charcoals were not generally suitable for use in a soluble PVA wrapping, but that an active charcoal having the characteristics of $C_3$ charcoal was, unexpectedly, indeed suitable for treating white wines or sugar-containing liquors.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A packaged active agent suited for purifying an impure aqueous medium, comprising a unit purifying amount of active charcoal powder sealedly confined within a wrapping film of a water-soluble polymer, said active charcoal powder having a capacity to adsorb that amount of said water-soluble polymer that dissolves in such aqueous medium upon introduction therein said water-soluble polymer being polyvinyl alcohol.

2. The package as defined by claim 1, said active charcoal powder comprising a chemical charcoal.

3. The package as defined by claim 2, said chemical charcoal having a pore volume greater than 1.5 cm$^3$/g, a BET specific surface greater than 1,700 m$^2$/g, an iodine index greater than 145 and a blue index greater than 19.

4. The package as defined by claim 3, wherein the ratio by weight of said polyvinyl alcohol to said chemical active charcoal ranges from 0.1% to 5%.

5. A process for purifying an impure aqueous medium, comprising introducing into such medium the package as defined by claim 1, permitting said package to dissolve and intimately contacting said active charcoal powder with said impure aqueous medium for such period of time as to sorb one or more impurities therein onto said active charcoal powder, and thence recovering the aqueous medium thus purified whereby essentially none of said water-soluble polymer is present therein, and optionally filtering the aqueous medium thus purified.

6. The process as defined by claim 5, said impure aqueous medium comprising a white wine.

7. The process as defined by claim 5, said impure aqueous medium comprising a sugar syrup.

* * * * *